United States Patent
Yau et al.

[11] Patent Number: 6,165,653
[45] Date of Patent: Dec. 26, 2000

[54] PROTECTING LAYER FOR GELATIN BASED PHOTOGRAPHIC PRODUCTS CONTAINING 1H-PYRAZOLO[1,5,-B][1,2,4] TRIAZOLE-TYPE MAGENTA COUPLER

[75] Inventors: Hwei-ling Yau, Rochester; Brian Thomas, Pittsford, both of N.Y.

[73] Assignee: Eastman Kodak Company, Rochester, N.Y.

[21] Appl. No.: 09/354,556

[22] Filed: Jul. 15, 1999

[51] Int. Cl.[7] .............................. G03C 7/38; G03C 11/08; G03C 1/76; B41J 2/01
[52] U.S. Cl. .............................. 430/14; 430/17; 430/432; 430/527; 430/536; 430/558 R; 430/961; 347/105
[58] Field of Search ..................... 430/536, 961, 430/432, 527, 558 R, 14, 17; 347/105

[56] References Cited

U.S. PATENT DOCUMENTS

| | | |
|---|---|---|
| 2,173,480 | 9/1939 | Jung . |
| 2,719,791 | 10/1955 | Land . |
| 2,751,315 | 6/1956 | Staehle . |
| 2,956,877 | 10/1960 | Land et al. . |
| 3,492,252 | 1/1970 | Euchner et al. . |
| 4,092,173 | 5/1978 | Novak et al. . |
| 4,139,514 | 2/1979 | Bassett ............................... 260/29.6 H |
| 4,171,979 | 10/1979 | Novak et al. . |
| 4,279,945 | 7/1981 | Audran et al. ......................... 430/140 |
| 4,302,523 | 11/1981 | Audran et al. ......................... 430/140 |
| 4,333,998 | 6/1982 | Leszyk ................................... 430/12 |
| 4,426,431 | 1/1984 | Harasta et al. ........................... 430/14 |
| 4,560,714 | 12/1985 | Gajria et aal. .......................... 523/409 |
| 4,665,015 | 5/1987 | Iijuma et al. ....................... 430/558 R |
| 4,882,266 | 11/1989 | Kawagishi et al. ................. 430/558 R |
| 5,032,497 | 7/1991 | Nakayama et al. ................. 430/538 R |
| 5,376,434 | 12/1994 | Ogawa et al. ......................... 430/627 |
| 5,447,832 | 9/1995 | Wang et al. ........................... 430/527 |
| 5,853,965 | 12/1998 | Haydock et al. ...................... 430/536 |
| 5,866,282 | 2/1999 | Bourdelais et al. ................... 430/536 |
| 5,874,205 | 2/1999 | Bourdelais et al. ................... 430/536 |
| 5,875,370 | 2/1999 | Patton et al. ......................... 396/606 |
| 5,888,643 | 3/1999 | Aylward et al. ....................... 430/536 |
| 5,888,681 | 3/1999 | Gula et al. ............................ 430/536 |
| 5,888,683 | 3/1999 | Gula et al. ............................ 430/536 |
| 5,888,714 | 3/1999 | Bourdelais et al. ................... 430/536 |
| 5,905,924 | 5/1999 | Patton et al. ......................... 396/606 |
| 5,952,130 | 9/1999 | Kave et al. ........................... 430/536 |

OTHER PUBLICATIONS

Markus Antonietti, Microgels–Polymers with a Special Molecular Architecture, 1988, pp. 1813–1817.

Werner Funke, Reactive Microgels–Polymers Intermediate In Size between Single Molecules and Particles, 1989, pp. 107–115.

John L. Gardon, Emulsion Polymerization, 1977, pp. 143–197.

W.E. Lee and E.R. Brown, The Developing Agents and their Reactions, The Theory of Photographic Process, 1977, pp. 291–327.

Research Disclosure No. 37038, Feb. 1995, Typical and Preferred Colored Paper, Color Negative, and Color Reversal Photographic Elements and Processing.

Research Disclosure No. 34390, Nov. 1992, Photographic Light–Sensitive Silver Halide Film Can Comprise a Trasparent Magnetic Recording Layer, Usually Provided on the Backside of the Photographic Support.

*Primary Examiner*—Richard L. Schilling
*Attorney, Agent, or Firm*—Doreen M. Wells

[57] ABSTRACT

An overcoat composition comprising a water insoluble polymer having a Tg equal to or less than 30° C. and comprising 75 to 100 weight percent of the monomer having the following formula:

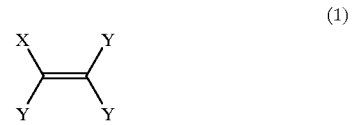

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and wherein said overcoat composition being superposed on an imaged light sensitive silver halide emulsion layer on a support, said silver halide emulsion layer containing 1H-pyrazolo[1,5-b][1,2,4]triazole type of magenta coupler. Optionally, the polymer composition may contain a second polymer having a Tg greater than 30° C.

18 Claims, No Drawings

PROTECTING LAYER FOR GELATIN BASED PHOTOGRAPHIC PRODUCTS CONTAINING 1H-PYRAZOLO[1,5,-B][1,2,4] TRIAZOLE-TYPE MAGENTA COUPLER

CROSS REFERENCE TO RELATED APPLICATIONS

The present invention is related to commonly owned U.S. applications filed on even date herewith: U.S. Ser. No. 09/354,055 of Yau et al., titled OVERCOAT MATERIAL AS PROTECTING LAYER FOR IMAGE RECORDING MATERIALS, U.S. Ser. No. 09/353,939 of Yau et al., titled WATER-RESISTANT PROTECTIVE OVERCOAT FOR IMAGE RECORDING SYSTEMS and U.S. Ser. No. 09/354,209 of Yau et al., titled PROTECTING LAYER FOR IMAGE RECORDING MATERIALS.

FIELD OF THE INVENTION

The present invention relates to image recording materials. More particularly the present invention discloses a protective overcoat, which provides excellent scratch and fingerprint resistance, water resistance and also light stability to imaged gelatin based AgX photographic products containing a 1H-pyrazolo[1,5-b][1,2,4]triazole type of magenta coupler.

BACKGROUND OF THE INVENTION

Gelatin based photographic materials are known to be very swellable when in contact with water. The swelling property is essential in order to accomplish photographic processing chemistry to generate images. However, the same property also inhibits the end users from fully enjoying the product, such as passing around without worry about spilling drinks or leaving finger prints on the prints, or keeping them in envelopes in order not to be scratched.

The concept of applying a colloidal suspension to moist film or print material at the end of photographic processing has been disclosed in U.S. Pat. No. 2,173,480 (1939). However, since the best way to use this technology is to implement it in currently existing photofinishing equipment and laboratories, useful inventions must focus on material compositions that will best fit in with current photofinishing systems. Teachings on various methods and apparatus for applying a controlled amount of material on the photographic products during photographic processing have been filed: U.S. Ser. No. 08/965,560 (filed Nov. 6, 1997), U.S. Pat. No. 5,905,924 and U.S. Pat. No. 5,875,370.

The temperature and residence time of photographic coatings in the drying section of photofinishing trade equipment vary from 50° C. to 70° C. and from 30 seconds to 2.5 minutes. The actual temperature of gelatin coating during drying is much lower than the temperature set for the dryer due to the evaporation of water. In addition, it is necessary to be free of volatile organic compound (VOC) in the formulation in order to be user and environment friendly. Under these stringent requirements, it appears that an aqueous colloidal dispersion of water insoluble polymeric materials is the only appropriate system for this technology. Water soluble materials will not provide water resistance property.

U.S. Pat. No. 2,719,791 describes the use of an aqueous dispersion of organic plastic material, which yields a water impermeable coating on drying. However, it is known that when dispersions of low Tg material (Tg<25° C.) are used to obtain a water resistant protective coating, the surface of the protective coating has an undesirable tacky characteristic, which generally degrades other physical properties in customers hands, such as print blocking, fingerprinting, dust attraction and high scratch propensity. When dispersions of high Tg materials (Tg>25° C.) are used, it is not possible to form a continuous water resistant layer on the prints under the drying condition described above. U.S. Pat. No. 2,751,315 also describes the use of aqueous dispersion of copolymer materials. It was recognized in the patent that the low Tg materials were not quite suitable and therefore higher Tg polymer in combination with a high-boiling-point organic cosolvent was used in order to form a water resistant protective coating. However, the organic solvent that is released from the formulation during drying creates an environmental concern if used in the current photofinishing laboratories with high throughput. U.S. Pat. No. 2,956,877 describes the method of applying a solution that would solubilize the processing reagents from the photographic products as well as forming a protective coating on its surface. The disadvantage of this approach is that not only can the acid groups on the polymer degrade the water resistant property of the final protective layer, but also the organic solvent required in the formulation is, again, not suitable for high volume photofinishing laboratories.

A series of patents describes the application of UV-polymerizable monomers and oligomers on imaged photographic products followed by UV exposure to cure the formulation in order to obtain a crosslinked durable protective layer, e.g. U.S. Pat. Nos. 4,092,173, 4,171,979, 4,333,998 and 4,426,431. The major concern for this type of technology is that the use of highly toxic multi-functional monomer compounds in the formulation prevents it from being environmentally and user friendly, and the relatively short shelf life of the coating solutions.

U.S. Pat. No. 5,376,434 describes the use of at least two resins in the protective overcoat layer of a photographic print, at least one first resin having a glass transition temperature (Tg) of not less than 80° C., and at least one second resin having a Tg of 0° C. to 30° C., wherein an arithmetic mean of the glass transition temperatures of said first resin and said second resin is 30° C. to 70° C. The patent teaches the use of the high Tg resin to reduce the stickiness of the overcoat due to the low Tg material.

U.S. Pat. No. 5,447,832 describes coating compositions for imaging elements comprising aqueous-based mixtures of lower Tg, film-forming polymeric particles and higher-Tg, non-film-forming polymeric particles. The film-forming particles provide continuous film formation and the non-film-forming particles comprising glassy polymers provide resistance to tackiness, blocking, ferrotyping, abrasion and scratching. While recognizing the above-mentioned benefits of two-component aqueous dispersions cited in U.S. Pat. No. 5,376,434 and 5,447,832, U.S. Ser. No. 09/136,375 (filed Aug. 19, 1998; now U.S. Pat. No. 5,952,130) further disclosed preferred substituents on the high and low Tg components in two-latex formulations in order to obtain improved fingerprint resistance. Most preferred monomers are acrylonitrile, methacrylonitrile, vinylidene chloride and vinylidene fluoride. U.S. Ser. No. 09/136,375 further describes the use of a combination of at least two aqueous colloidal dispersions of water insoluble polymeric materials for protective overcoat of AgX photographic prints, at least one has Tg less than 25° C. and at least one has Tg equal to or greater than 25° C. The low Tg material comprises 20% to 95% by weight of the total material laydown, and the high Tg material comprises 5% to 80% by weight of the total material laydown. Furthermore, to provide fingerprint resistance, at least one of the materials used in the combination, regardless of its Tg, contains one or more comonomers of that invention (see formula (1) below) at 20% to 100% by weight based on the total monomers,

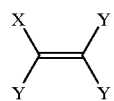

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

One problem encountered in the field of photography but not mentioned in the art cited above is light stability of imaged, gelatin-based AgX photographic products containing certain types of magenta couplers. Therefore, there is need for classes of polymeric materials which overcome the problems discussed above, but also address and solve the additional problem of light instability encountered in products containing such couplers.

SUMMARY OF THE INVENTION

The present invention describes a material formulation free of volatile organic compounds or solvents that is applied to a photographic product at the end of photographic processing and dried under conventional drying conditions to form a water resistant, scratch resistant, and fingerprint resistant durable overcoat while also providing improved light stability for imaged photographic products containing 1H-pyrazolo[1,5-b][1,2,4]triazole types of magenta couplers in the magenta image layer. The material composition described in this invention comprises a colloidal dispersion of a water insoluble polymeric material having a glass transition temperature equal to or less than 30° C.

In this invention, the class of materials identified can be used with or without high Tg latex to give high gloss, satisfactory non-tacky property and instantaneous fingerprint resistance without further treatment. The novel class of material has glass transition temperature (Tg) equal to or less than 30° C. and consists of one or more co-monomers of this invention (see Formula (1) below) at 75% to 100%, and preferably 80% to 95%, by weight based on the total monomers.

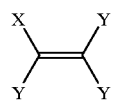

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile, 2-ethoxyacrylonitrile, cis-3-methoxyacrylonitrile, cis-3-ethoxyacrylonitrile, 2-acetoxyacrylonitrile, fumaronitrile, maleonitrile. Most preferred monomers vinylidene chloride, vinyl chloride, acrylonitrile, methacrylonitrile, and vinylidene fluoride.

Alternatively, and optionally, the present formulation may be a combination of at least two aqueous colloidal dispersions of water insoluble polymeric materials, at least one having a Tg equal to or less than 30° C. and contains one or more comonomers of the invention (see structure (1) above) at 75% to 100% and preferably 80% to 95% by weight based on the total monomers in the composition. The formulation of the invention may also contain at least one additional latex having Tg greater than 30° C. and having average particle size between 20 nm and 80 nm. Preferably, the second latex is a microgel particle (MP). The thus obtained overcoat for imaged photographic products has superior stain resistance, wet and dry scratch resistance, fingerprint resistance, and does not deteriorate the light stability of imaged products containing a 1H-pyrazolo[1,5-b][1,2,4] triazole type of magenta coupler.

Microgel particles are highly crosslinked polymer particles prepared by emulsion polymerization. Microgel particles of this invention are typically comprised, based on total weight of the monomer mixture, from about 5 to 50%, most preferably from about 5 to 20%, of a polymerizable carboxylic acid monomer, 2 to 20% of a difunctional crosslinking monomer, with the balance of the microgel composition comprising water-insoluble, ethylenically unsaturated or vinyl-type monomers.

Hence, the present invention discloses an imaged photographic element comprising:

an overcoat composition comprising a water insoluble polymer having a Tg equal to or less than 30° C. and comprising 75 to 100 weight percent of the monomer having the following formula:

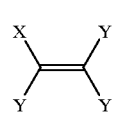

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and wherein said overcoat composition being superposed on an imaged light sensitive silver halide emulsion layer on a support, said silver halide emulsion layer containing 1H-pyrazolo[1,5-b][1,2,4]triazole type of magenta coupler.

Optionally, the element may comprise a second monomer having a Tg greater than 30° C.

Materials of the invention provide unexpected improvement on image dye light stability for prints obtained from photographic paper containing 1H-pyrazolo[1,5-b][1,2,4] triazole-type couplers in the magenta image layer.

DETAILED DESCRIPTION OF THE PREFERRED EMBODIMENT

The present invention describes a material formulation free of volatile organic compounds or solvents that is applied to a photographic product at the end of photographic processing and dried under ordinary rying conditions to form a water resistant, scratch resistant, and fingerprint resistant durable overcoat. A further inventive aspect that improves upon the prior art as exemplified by U.S. Pat. No. 5,376,434 is the optional elimination of the use of high Tg particles in the formula without incurring tackiness on handling. The material composition described in the present invention is a colloidal dispersion of water insoluble polymeric material having glass transition temperature equal to or less than 30° C. and consists of one or more co-monomers of this invention (see structure (1) below) at 75% to 100%, and preferably 80% to 95%, by weight based on the total monomers.

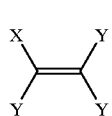
(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile, 2-acetoxyacrylonitrile, fumaronitrile, maleonitrile. Most preferred monomers vinylidene chloride, vinyl chloride, acrylonitrile, methacrylonitrile, and vinylidene fluoride.

Optionally, the present formulation may be a combination of at least two aqueous colloidal dispersions of water insoluble polymeric materials, at least one having a Tg equal to or less than 30° C. and contains one or more comonomers of the invention (see structure (1) above) at 75% to 100% and preferably 80% to 95% by weight based on the total monomers in the composition. The formulation of the invention may also contain at least one additional latex having Tg greater than 30° C. and having average particle size between 20 nm and 80 nm. The second latex preferably is a microgel particle. The thus obtained overcoat for imaged photographic products has superior stain resistance, wet and dry scratch resistance, fingerprint resistance, and improves the light stability of imaged products containing a 1H-pyrazolo[1,5-b][1,2,4]triazole type of magenta coupler.

Microgel particles (the optional second component in the formulation) are highly crosslinked polymer particles prepared by emulsion polymerization. Microgel particles of this invention are typically comprised, based on total weight of the monomer mixture, from about 5 to 50%, most preferably from about 5 to 20%, of a polymerizable carboxylic acid monomer, 2 to 20% of a difunctional crosslinking monomer, with the balance of the microgel composition comprising water-insoluble, ethylenically unsaturated or vinyl-type monomers.

The latex overcoat of this invention is particularly useful when applied to photographic prints containing 1H-pyrazolo[1,5-b][1,2,4]triazole types of couplers in the magenta image layer. The resulting prints not only have added features of resistance to stain, scratches, fingerprints, thermal blocking, but also have unexpected improvement of image stability to light exposure compared to unprotected prints.

Microgel particles are highly crosslinked polymer particles prepared by the emulsion polymerization. The definition of microgel particles can be found in British Polymer Journal 21, 107–115(1989) by W. Funke and in Angew. Chem. 100, 1813–1817 (1988) by M. Antonietti. Microgel particles are highly crosslinked and thus not soluble in any solvents but are dispersible in water. The preferred microgel particles of this invention have Tg higher than 30° C., average particle size between 20 nm and 80 nm, preferably between 30 and 70 nm, and are highly water-swellable. The microgels of this invention can broadly be described as crosslinked particles of copolymer containing as its essential monomeric components a small amount of a difunctional crosslinking monomer, a polymerizable carboxylic acid monomer and one or more polymerizable low water-solubility vinyl monomers. Microgel particles of this invention typically comprise from about 5 to 50%, and most preferably from about 5 to 20% by total weight of the monomer mixture of the polymerizable carboxylic acid monomer, 2 to 20% of difunctional crosslinking monomer, with the balance of the microgel composition comprising water-insoluble, vinyl or addition-type monomers.

Examples of the polymerizable carboxylic acid monomer are methacrylic acid, acrylic acid, crotonic acid, itaconic acid, maleic acid, fumaric acid, various other substituted carboxylic acid monomers containing from 3 to 8 carbon atoms such as 2-carboxyethylacrylate, 3-acryloamido-3-methyl-butanoic acid, 3-acryloamidohydroxy-acetic acid, acryloamidohexanoic acid, N,N-bisacryloamido-acetic acid, and the monoesters of dicarboxylic acids such as methyl hydrogen maleate, ethyl hydrogen fumarate, and the like, of which methacrylic acid is particularly preferred.

Another monomeric component of the microgel particles is the relatively water-insoluble, carboxylic-free vinyl monomer. Suitable monomers of this class include styrene, the o-,m-,and p-alkyl or aryl styrenes wherein the substituent group has from 1 to 8 carbon atom such as o-methylstyrene, m-ethylstyrene, p-methylstyrene, p-tert-butylstyrene, the 2,4-, 2,5- and 3,4-dimethylstyrenes, 4-methoxystyrene, 4-phenylstyrene, 4-phenoxystyrene, 4-benzylstyrene, 2,6-dimethylstyrene, 2,6-dimethoxystyrene, 2,5-diethylstyrene, alpha-methylstyrene, 3,4-dimethylstyrene, halostyrenes such as 4-chlorostyrene, the 2,5-, 3,4- and 2,6-dichlorostyrene, and the corresponding fluorostyrenes and bromstyrenes; vinyl toluene, isopropenyl toluene, and vinyl-naphthalene; alkyl or aryl esters of the ethylenically unsaturated carboxylic acids having from 1 to about 8 carbon atoms in the ester (alcohol) group, such as the methyl, ethyl, propyl, butyl, hexyl, ethylhexyl, phenyl, and benzyl methacrylates, acrylates, and crotonates; dimethyl maleate; dibutylmaleate; dibutylfumarate; dihexylitaconate; nitrile monomers, such as acrylonitrile and methacrylonitrile; vinyl esters such as vinyl acetate, vinyl propionate, vinyl stearate, vinyl butyrate, vinyl laurate, etc.; and mixtures thereof. Preferred monomers are styrene and its derivatives, and methacrylate monomers such as methyl methacrylate and ethyl methacrylate. Two or more preferred monomers can also be polymerized together in accordance with any of the various solubility and polymerizability requirements discussed above.

The difunctional crosslinking monomer is employed in an amount sufficient to crosslink the aqueous emulsion copolymer, thereby converting the copolymer to a non-linear polymeric microgel, without appreciably reducing the water-swellability. Typical amounts of the difunctional monomer are from 1 to 20% and more preferably from 2 to 10 % of the total polymer composition. Illustrative of difunctional crosslinking agents which may be used in the present invention are compounds such as ethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethylacrylate, pentaerythritol tetramethacrylate, triallyl cyanurate, divinyl ethane, divinyl sulfide, divinyl sulfone, hexatriene, triethyleneglycol dimethacrylate, diallyl cyanamide, glycol diacrylate, ethylene glycol divinyl ether, diallyl phthalate, divinyl dimethyl silane and glycerol trivinyl ether, of which divinyl benzene and ethylene glycol dimethacrylate are particularly preferred.

The microgel particles may be prepared by any conventional aqueous emulsion polymerization technique known to those skilled in the art. Suitable polymerization techniques of these types are described for example, in U.S. Pat. Nos. 3,492,252 and 4,139,514, incorporated in its entirety herein by reference. Typically, the microgel particles are prepared by emulsifying the monomeric materials and water soluble polymerization catalysts, in water with a suitable emulsifier for the monomers, and then heating the resulting aqueous emulsion at a temperature of from about 30° C. to about 95° C., preferably from about 60° C. to about 80° C., in a stirred heated reactor for a time from about one to about four hours until the polymerization reaction is complete. The ratio of monomer to water media is selected in order to provide a polymer emulsion having a solids content of from about 10 to about 45%, and preferably from about 20 to about 40% by weight.

The polymerization process can be carried out batchwise or semi-continuously. It is possible to work entirely batchwise, emulsifying the entire charge of monomer and proceeding with polymerization. It is usually advantageous, however, to start with part of the monomers which are to be used and add monomers as polymerization proceeds. An advantage of the gradual addition of monomers lies in reaching a high solids content with optimum control of particle size distribution. The other advantage of the semi-continuous process is that the final microgel particles tend to have much smaller particle size. Typical emulsifiers and catalysts used for the preparation of microgel particles are listed in U.S. Pat. No. 4,560,714. A chain transfer agent may optionally be present during the polymerization reaction at a concentration of from about 0 to about 5%. The preferred chain transfer agents are those that are relatively water soluble since they are more effective in the aqueous polymerization systems than are those that are water insoluble. Illustrative of such materials are the known alkyl and aryl mercaptans such as the essentially water soluble butyl mercaptan, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, n-dodecyl mercaptan, and tetradecyl mercaptan. The particle size of the microgel particles of this invention is from 20 to 80 nm and more preferably from 30 to 70 nm.

Some of the preferred microgel particles are shown in the Table 1 below.

TABLE 1

| Polymer I.D. | Composition | Weight Ratio |
| --- | --- | --- |
| MP-1 | Methyl Methacrylate | 80 |
|  | Methacrylic Acid | 5 |
|  | Ethylene Glycol Dimethacrylate | 15 |
| MP-2 | Methyl Methacrylate | 80 |
|  | Methacrylic Acid | 15 |
|  | Ethylene Glycol Dimethacrylate | 5 |
| MP-3 | Methyl Methacrylate | 75 |
|  | Methacrylic Acid | 15 |
|  | Ethylene Glycol Dimethacrylate | 10 |
| MP-4 | Methyl Methacrylate | 80 |
|  | Methacrylic Acid | 10 |
|  | Ethylene Glycol Dimethacrylate | 10 |
| MP-5 | Ethyl Methacrylate | 80 |
|  | Methacrylic Acid | 10 |
|  | Ethylene Glycol Dimethacrylate | 10 |
| MP-6 | Ethyl Methacrylate | 75 |
|  | Methacrylic Acid | 15 |
|  | Ethylene Glycol Dimethacrylate | 10 |
| MP-7 | Ethyl Methacrylate | 85 |
|  | Methacrylic Acid | 10 |
|  | Ethylene Glycol Dimethacrylate | 5 |
| MP-8 | Styrene | 80 |
|  | Methacrylic Acid | 10 |
|  | Divinyl Benzene | 10 |
| MP-9 | Styrene | 80 |
|  | Methacrylic Acid | 15 |
|  | Divinyl Benzene | 5 |
| MP-10 | Styrene | 75 |
|  | Methacrylic Acid | 15 |
|  | Divinyl Benzene | 10 |
| MP-11 | Styrene | 90 |
|  | Methacrylic Acid | 5 |
|  | Divinyl Benzene | 5 |
| MP-12 | Styrene | 80 |
|  | Acrylic Acid | 10 |
|  | Divinyl Benzene | 10 |
| MP-13 | Styrene | 80 |
|  | Acrylic Acid | 15 |
|  | Divinyl Benzene | 5 |
| MP-14 | Styrene | 80 |
|  | Methacrylic Acid | 10 |
|  | Ethylene Glycol Dimethacrylate | 10 |
| MP-15 | Styrene | 80 |
|  | Methacrylic Acid | 15 |
|  | Ethylene Glycol Dimethacrylate | 5 |
| MP-16 | Methyl Methacrylate | 80 |
|  | Methacrylic Acid | 10 |
|  | Divinyl Benzene | 10 |
| MP-17 | Ethyl Methacrylate | 80 |
|  | Methacrylic Acid | 10 |
|  | Divinyl Benzene | 10 |
| MP-18 | Vinyl Toluene | 80 |
|  | Methacrylic Acid | 10 |
|  | Divinyl Benzene | 10 |
| MP-19 | Ethyl Methacrylate | 80 |
|  | Acrylic Acid | 10 |
|  | Ethylene Glycol Dimethacrylate | 10 |
| MP-20 | Methyl Methacrylate | 40 |
|  | Ethyl Methacrylate | 40 |
|  | Methacrylic Acid | 10 |
|  | Ethylene Glycol Dimethacrylate | 10 |

TABLE 1-continued

| Polymer I.D. | Composition | Weight Ratio |
|---|---|---|
| MP-21 | Methyl Methacrylate | 40 |
| | n-Butyl Methacrylate | 40 |
| | Methacrylic Acid | 10 |
| | Ethylene Glycol Dimethacrylate | 10 |
| MP-22 | Styrene | 40 |
| | n-Butyl Methacrylate | 40 |
| | Methacrylic Acid | 10 |
| | Ethylene Glycol Dimethacrylate | 10 |
| MP-23 | Styrene | 40 |
| | n-Butyl Methacrylate | 40 |
| | Methacrylic Acid | 10 |
| | Divinyl Benzene | 10 |
| MP-24 | Ethyl Methacrylate | 40 |
| | n-Butyl Methacrylate | 40 |
| | Methacrylic Acid | 10 |
| | Ethylene Glycol Dimethacrylate | 10 |
| MP-25 | Ethyl Methacrylate | 30 |
| | n-Butyl Methacrylate | 50 |
| | Methacrylic Acid | 10 |
| | Ethylene Glycol Dimethacrylate | 10 |
| MP-26 | Ethyl Methacrylate | 45 |
| | n-Butyl Methacrylate | 45 |
| | Methacrylic Acid | 5 |
| | Ethylene Glycol Dimethacrylate | 5 |
| MP-27 | Ethyl Methacrylate | 40 |
| | n-Butyl Methacrylate | 50 |
| | Methacrylic Acid | 5 |
| | Ethylene Glycol Dimethacrylate | 5 |
| MP-28 | Styrene | 45 |
| | n-Butyl Methacrylate | 45 |
| | Methacrylic Acid | 5 |
| | Ethylene Glycol Dimethacrylate | 5 |

The weight ratio of the microgel particles to the low Tg film forming materials defined in structure (1) can be from 3:97 to 50:50 by weight. The average particle size of the first low Tg colloidal dispersions of hydrophobic materials can be from 20 nm to 250 nm. The dry laydown of the total materials on the surface of photographic product can be from 30 mg/sq.ft. to 600 mg/sq.ft. Other components commonly used in photographic processing solutions, such as biocides, spreading aids (surfactants), lubricants and waxes can also be incorporated in the formulation as needed. The concentration of the formulation can be from 1% solids to 50% solids depending on the thickness of the protective layer one wishes to apply, the machine speed, the dryer efficiency and other factors that may affect the solution uptake by the photographic product.

The monomers defined in Formula (1) can be copolymerized with other monomers in order to adjust their physical properties, such as particle size, latex stability, Tg, water resistance, dry and wet scratch resistance, and fingerprint resistance. Examples of ethylenically unsaturated monomers which can be copolymerized with monomers defined in formula (1) include carboxylic acids, for example, acrylic acid, alpha-chloroacrylic acid, alpha-alkylacrylic acids (such as methacrylic acid, etc.), ethylenic unsaturated salts of sulfonate or sulfate (such as sodium acrylamide-2-methylpropane-sulfonate, sodium vinylbenzenesulfonate, potassium vinylbenzylsulfonate, sodium vinylsulfonate), esters or amides derived from acrylic and methacrylic acid (for example, acrylamide, methacrylamide, n-butylacrylamide, t-butylacrylamide, diacetone acrylamide, methyl acrylate, ethyl acrylate, n-propyl acrylate, n-butyl acrylate, tert-butyl acrylate, iso-butyl acrylate, 2-ethylhexyl acrylate, n-octyl acrylate, lauryl acrylate, methyl methacrylate, ethyl methacrylate, n-butyl methacrylate, beta-hydroxy methacrylate, etc.), hydroxyalky esters or amides derived from acrylic and methacrylic acid (for example, 2-hydroxyethylacrylate, 2-hydroxyethylmethacrylate, 2-hydroxypropylacrylate, 2-hydroxypropylmethacrylate, 4-hydroxybutyl methacrylate, 4-hydroxyphenyl methacrylate, 3-hydroxypropyl methacrylate, 2-(caprolactone)ethyl methacrylate, polyethyleneglycol methacrylate, vinyl esters (for example, vinyl acetate, vinyl propionate, vinyl laurate, etc.), acrylonitrile, methacrylonitrile, aromatic vinyl compounds (for example, styrene and derivatives thereof (for example, vinyl toluene, divinyl benzene, vinyl acetophenone, sulfostyrene, etc.), itaconic acid, citraconic acid, crotonic acid, vinylidene chloride, vinyl alkyl ethers (for example, vinyl ethyl ether, etc.), esters of maleic acid, N-vinyl-2-pyrrolidone, N-vinylpyridine, 2- or 4-vinylpyridine, and difunctional crosslinking monomers (for example, divinyl benzene, ethyleneglycol dimethacrylate, ethyleneglycol diacrylate, diethyleneglycol diacrylate, diethyleneglycol dimethacrylate, triethyleneglycol diacrylate, triethyleneglycol dimethacrylate, tetraethyleneglycol diacrylate, tetraethyleneglycol dimethacrylate, 1,4-butanediol diacrylate, 1,6-hexanediol diacrylate, 1,9-nonanediol diacrylate, neopentyl glycol diacrylate, tripropylene glycol diacrylate, 1-acryloxy-3-methacryloxy glycerol, trimethylolpropane triacrylate, pentaerythritol triacrylate, glycerol propoxy triacrylate, pentaerythritol tetraacrylate) etc. Of these monomers, esters of acrylic acid, esters of methacrylic acid, and esters of maleic acid are particularly preferred.

Two or more ethylenically unsaturated monomers can be used together. For example, a combination of methyl acrylate and butyl acrylate, ethyl acrylate and itaconic acid, hydroxyethylacrylate and ethylacrylate, methyl acrylate and ethyl acrylate, etc., can be used.

The polymer of this invention can be prepared by emulsion polymerization or solution polymerization technique. Emulsion polymerization is preferred. Emulsion polymerization is well known in the art and is described, for example, in J. L. Gardon, "Emulsion Polymerization," Chapter 6 in "Polymerization Processes" edited by C. E. Schildknecht and I. Skeist, published by Wiley and Sons, Inc., New York, 1977. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogensulfate, potassium persulfate-sodium metabisulfite, potassium persulfate-sodium hydrogen bisulfite, cerium salt-alcohol, etc. Emulsifiers which may be used in the emulsion polymerization include soap, a sulfonate (for example, sodium N-methyl-N-oleoyltaurate, sodium dodecylbenzene sulfonate alpha-olefin sulfonate, diphenyloxide disulfonate, naphthalene sulfonate, sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.). Specific examples and functions of the emulsifiers are described in J. L. Gardon, "Emulsion Polymerization," Chapter 6 in "Polymerization Processes" edited by C. E. Schildknecht and I. Skeist, published by Wiley and Sons, Inc., New York, 1977 and references contained therein.

The imaged photographic elements protected in accordance with this invention are derived from silver halide photographic elements that can be black and white elements (for example, those which yield a silver image or those which yield a neutral tone image from a mixture of dye forming couplers), single color elements or multicolor elements. Multicolor elements typically contain dye image-forming units sensitive to each of the three primary regions of the spectrum. The imaged elements can be imaged elements which are viewed by transmission, such a negative film images, reversal film images and motion picture prints or they can be imaged elements that are viewed by reflection, such as paper prints. Because of the amount of handling that can occur with paper prints and motion picture prints, they are preferred imaged photographic elements for use in this invention.

The photographic elements in which the images to be protected are formed can have the structures and components shown in Research Disclosure 37038. Specific photographic elements can be those shown on pages 96–98 of Research Disclosure 37038 as Color Paper Elements 1 and 2. A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. The element can additionally contain surfactants, coating aids, biocides, and other components commonly used in the formulation of photographic elements. All of these can be coated on a support which can be transparent (for example, a film support) or reflective (for example, a paper support). Support bases that can be used include both transparent bases, such as those prepared from polyethylene terephthalate, polyethylene naphthalate, cellulosics, such as cellulose acetate, cellulose diacetate, cellulose triacetate, and reflective bases such as paper, coated papers, melt-extrusion-coated paper, and laminated papers, such as those described in U.S. Pat. Nos. 5,853,965; 5,866,282; 5,874,205; 5,888,643; 5,888,681; 5,888,683; and 5,888,714. Photographic elements protected in accordance with the present invention may also include a magnetic recording material as described in Research Disclosure, Item 34390, November 1992, or a transparent magnetic recording layer such as a layer containing magnetic particles on the underside of a transparent support as described in U.S. Pat. Nos. 4,279,945 and 4,302,523.

Suitable silver halide emulsions and their preparation, as well as methods of chemical and spectral sensitization, are described in Sections I through V of Research Disclosure 37038. Color materials and development modifiers are described in Sections V through XX of Research Disclosure 37038. Vehicles are described in Section II of Research Disclosure 37038, and various additives such as brighteners, antifoggants, stabilizers, light absorbing and scattering materials, hardeners, coating aids, plasticizers, lubricants and matting agents are described in Sections VI through X and XI through XIV of Research Disclosure 37038. Processing methods and agents are described in Sections XIX and XX of Research Disclosure 37038, and methods of exposure are described in Section XVI of Research Disclosure 37038.

Photographic elements typically provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like). Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

Images can be developed in photographic elements in any of a number of well known photographic processes utilizing any of a number of well known processing compositions, described, for example, in T. H. James, editor, *The Theory of the Photographic Process*, 4th Edition, Macmillan, N.Y., 1977. In the case of processing a color negative element, the element is treated with a color developer (that is one which will form the colored image dyes with the color couplers), and then with an oxidizer and a solvent to remove silver and silver halide. In the case of processing a color reversal element or color paper element, the element is first treated with a black and white developer (that is, a developer which does not form colored dyes with the coupler compounds) followed by a treatment to render developable unexposed silver halide (usually chemical or light fogging), followed by treatment with a color developer. Development is followed by bleach-fixing, to remove silver or silver halide, washing and drying.

The present invention is illustrated by the following Examples.

EXAMPLES

Characterizations of Polymeric Materials
Glass Transition Temperature And Melting Temperature Both glass transition temperature (Tg) and melting temperature (Tm) of the dry polymer material were determined by differential scanning calorimetry (DSC), using a heating rate of 20° C./minute. Tg is defined herein as the inflection point of the glass transition and Tm is defined herein as the peak of the melting transition.

Particle Size Measurement

All particles were characterized by Photon Correlation Spectroscopy using a Zetasizer Model DTS5100 manufactured by Malvern Instruments. Z-average particle sizes are reported.

Material Preparation

P1 is the material of this invention, and P2 is a second latex added to the formula to improve the drying of latex coating, it does not have any impact on the concept of this invention. Wax-1 and Wax-2 were added to the formulation to control the surface friction characteristic of the latex coating. FT-248 was used as coating aid at 2 mg/sq.ft. in all examples.

P1 Ethyl Acrylate/Vinylidene Chloride/Itaconic Acid (10/88/2)

To a 20 gallon, stainless-steel reactor added 44 kg of demineralized water. The system was purged for 15–30 minutes with nitrogen. The temperature was set at 15° C. and the stirrer was set at 150 RPM. The following were added to the reactor in order: 104.6 g potassium metabisulfite dissolved in 500 ml demineralized water, 421.9 g itaconic acid, 2109.5 g ethylacrylate, 18.56 kg of vinylidene chloride, 469 g of Dowfax™ 2EP rinsed in with 1 kg demineralized water, and 104.6 g potassium persulfate dissolved in 1.5 kg demin water. The reactor port and the vent were closed. The reactor was pressurized to 2 psi with nitrogen. The internal temperature was set to 40° C., and held there for 16–20 hours. The product was then cooled to 20° C., and the vacuum was broken the nitrogen. The product was filtered through cheesecloth. Glass transition temperature is 9° C. as measured by DSC, average particle size obtained from PCS is 77 nm.

P2 Methyl Methacrylate/Ethylene Glycol Dimethacrylate/Methacrylic Acid (80/10/10)

To a 2 liter, glass reactor added 675 g demineralized water, and 48.76 g 30% Rhodapon™ UB STD. This solution was heated to 80° C. in a nitrogen atmosphere with 100 RPM stirring. To a 2 liter, glass head tank added 810 g demineralized water, 58.52 g 30% Rhodapon™ UB STD, 561.8 g methyl methacrylate, 70.2 g ethylene glycol dimethacrylate, and 70.2 g methacrylic acid. The head tank was stirred well to emulsify the ingredients. When all was ready, 2.926 g sodium persulfate was added to the reactor. Within two minutes, the monomer emulsion was started so that 1271 g of emulsion was added to the reactor over two hours. The product was then held at 80° C. for one hour followed by cooling to 60° C. In a 250 ml flask, 11.07 g of 30% hydrogen peroxide was diluted to 120 g with demineralized water. In a 20 ml vial, 0.89 g of erythorbic acid was dissolved in 20 g of demineralized water. When the reactor temperature was at 60° C. the erythorbic acid solution was added to the reactor over 10 seconds. Then 32 g of the peroxide solution was added to the reactor over 30 minutes. The product was held at 60° C. for one hour then cooled to 20° C. Average particle size obtained from PCS was 68 nm. and the glass transition temperature obtained from DSC was 126° C.

Wax-1

Jonwax™ 26, an aqueous dispersion of high density polyethylene wax particles, was purchased from SC Johnson at 25% solids and used as received. The melting point of this wax is 130° C., and the average particle size is 58 nm.

Wax-2

ML160™, an aqueous dispersion of carnauba wax particles, was purchased Michelman at 25% solids and used as received. The melting point of this wax is 88° C., and the average particle size is 109 nm.

Sample Preparation

A variety of papers with their layer structures or identity described below were used in the examples.

PAPER A

| Layer | Component | Amount (g/m$^2$) |
|---|---|---|
| 7 | Ludox AM ™ colloidal silica | 0.160 |
| | Gelatin | 0.650 |
| 6 | UV1 | 0.130 |
| | UV2 | 0.023 |
| | ST1 | 0.042 |
| | Di-butyl-phthalate | 0.025 |
| | 1,4-Cyclohexylenedimethylene bis(2-ethylhexanoate) | 0.025 |
| | Gelatin | 0.540 |
| 5 | Red sensitive silver | 0.200 |
| | Coupler C1 | 0.350 |
| | UV1 | 0.350 |
| | Tri-cresyl-phosphate | 0.595 |
| | Potassium tolylthiosulfonate | 0.003 |
| | Potassium toylsulfinate | 0.0003 |
| | Silver phenyl mercaptotetrazole | 0.0005 |
| | Gelatin | 1.350 |
| 4 | UV1 | 0.170 |
| | UV2 | 0.030 |
| | ST1 | 0.055 |
| | Di-butyl-phthalate | 0.033 |
| | 1,4-Cyclohexylenedimethylene bis(2-ethylhexanoate) | 0.033 |
| | Gelatin | 0.710 |
| 3 | Green sensitive silver | 0.170 |
| | Coupler M1 | 0.320 |
| | Tri-cresyl-phosphate | 0.960 |
| | Phenyl-mercapto-tetrazole | 0.00054 |
| | Gelatin | 1.430 |
| 2 | ST1 | 0.066 |
| | Irganox 1076 ™ | 0.010 |
| | Di-butyl-phthalate | 0.190 |
| | 1,3-Benzenedisulfonic acid, 4,5 dihydroxy-,disodium salt | 0.065 |
| | Gelatin | 0.750 |
| 1 | Blue sensitive silver | 0.240 |
| | Coupler Y1 | 0.410 |
| | ST2 | 0.120 |
| | ST6 | 0.120 |
| | N-tert-butylacrylamide/n-butyl acrylate copolymer 50/50 | 0.484 |
| | Tri-hexyl-citrate | 0.216 |
| | ST7 | 0.0097 |
| | Gelatin | 1.310 |
| Support | Polyethylene laminated paper with TiO2/ZnO in the polyethylene laminated first layer side | |

PAPER B

As Paper A but Tri-cresyl-phosphate in layer 3 was replaced by N,N-di-ethyl lauramide.

PAPER C

Fuji Super FA-5 Paper which contains a coupler of the 1H-pyrazolo[1,5-b][1,2,4]trazole type in the green sensitive layer, coupler M2.

PAPER D

Konica QA Type 6 Paper which contains a coupler of the 1H-pyrazolo[5,1-c]-1,2,4-triazole type in the green sensitive layer, coupler M3.

PAPER E

As Paper A except the following changes were made:
Layer 5 was replaced by layer 5a.

| 5a | Red sensitive silver | 0.200 |
|---|---|---|
| | Coupler C1 | 0.380 |
| | UV1 | 0.240 |

| | | |
|---|---|---|
| | Di-butyl-phthalate | 0.370 |
| | 2-(2-Butoxyethoxy)ethyl acetate | 0.040 |
| | Potassium tolylthiosulfonate | 0.003 |
| | Potassium toylsulfinate | 0.0003 |
| | Silver phenyl mercaptotetrazole | 0.0005 |
| | Gelatin | 1.350 |

Layer 3 was replaced by layer 3a containing a magenta coupler of the 1H-pyrazlo[5,1-c]-1,2,4-triazole type (coupler M3).

| | | |
|---|---|---|
| 3a | Green sensitive silver | 0.080 |
| | Coupler M3 | 0.240 |
| | Stabilizer ST2 | 0.090 |
| | Stabilizer ST3 | 0.060 |
| | Stabilizer ST4 | 0.610 |
| | Di-butyl-phthalate | 0.090 |
| | Phenyl-mercapto-tetrazole | 0.00054 |
| | Gelatin | 1.420 |

Layer 1 was replaced by layer 1a

| | | |
|---|---|---|
| 1a | Blue sensitive silver | 0.230 |
| | Coupler Y1 | 0.410 |
| | N-tert-butylacrylamide/n-butyl acrylate copolymer 50/50 | 0.410 |
| | Di-butyl-phthalate | 0.180 |
| | ST7 | 0.0097 |
| | Gelatin | 1.310 |

PAPER F

As Paper A except the following changes were made
Layer 6 was replaced by layer 6a.

| | | |
|---|---|---|
| 6 | UV1 | 0.180 |
| | UV2 | 0.032 |
| | ST1 | 0.042 |
| | 1,4-Cyclohexylenedimethylene bis(2-ethylhexanoate) | 0.070 |
| | Gelatin | 0.430 |

Layer 5 was replaced by layer 5a (see above).

Layer 4 was replaced by layer 4a.

| | | |
|---|---|---|
| 4a | UV1 | 0.230 |
| | UV2 | 0.041 |
| | ST1 | 0.055 |
| | 1,4-Cyclohexylenedimethylene bis(2-ethylhexanoate) | 0.090 |
| | Gelatin | 0.549 |

Layer 3 was replaced by layer 3b containing a magenta coupler of the pyrazolone type (coupler M4).

| | | |
|---|---|---|
| 3b | Green sensitive silver | 0.199 |
| | Coupler M4 | 0.420 |
| | ST5 | 0.327 |
| | ST1 | 0.042 |
| | Tris-(2-ethyl hexyl) Phosphate | 0.410 |
| | 2-(2-Butoxyethoxy)ethyl acetate | 0.069 |
| | Phenyl-mercapto-tetrazole | 0.00054 |
| | Gelatin | 1.26 |

Layer 1 was replaced by layer 1b.

| | | |
|---|---|---|
| 1b | Blue sensitive silver | 0.235 |
| | Coupler Y1 | 0.484 |
| | N-tert-butylacrylamide/2-acrylamido-2methylpropane sulfonic acid sodium salt copolymer 99:1 | 0.484 |
| | Di-butyl-phthalate | 0.330 |
| | ST7 | 0.0097 |
| | Gelatin | 1.530 |

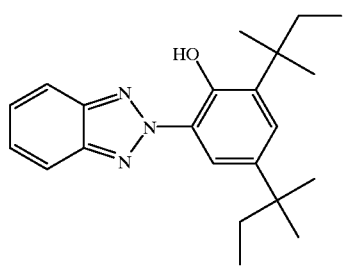

UV1

-continued
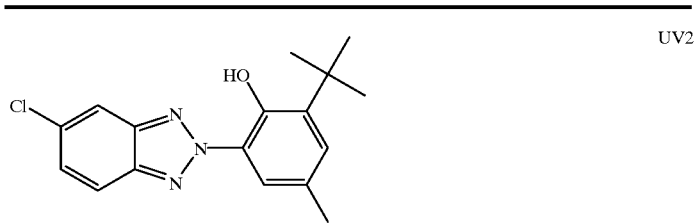
UV2
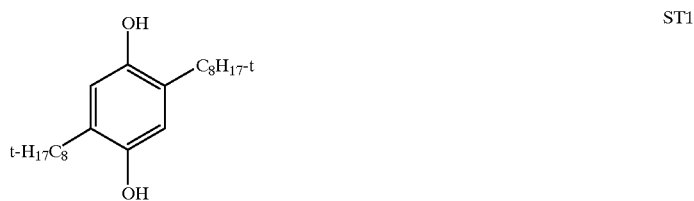
ST1
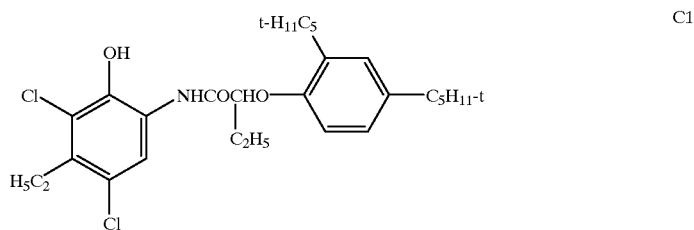
C1
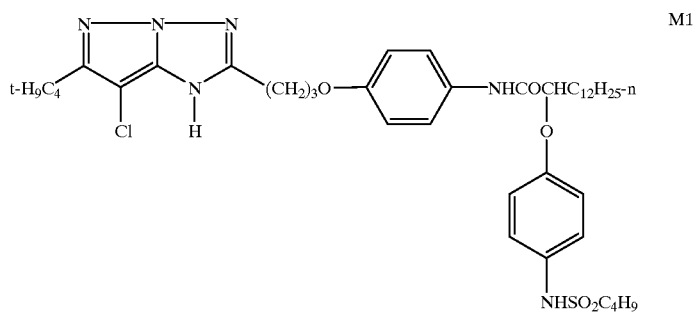
M1
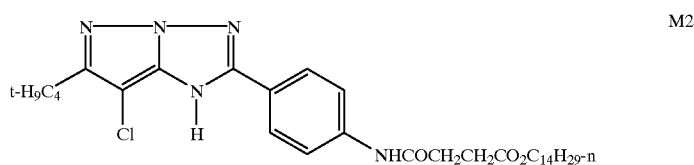
M2
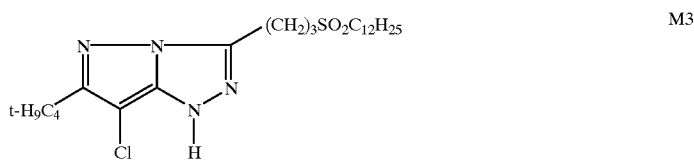
M3

-continued
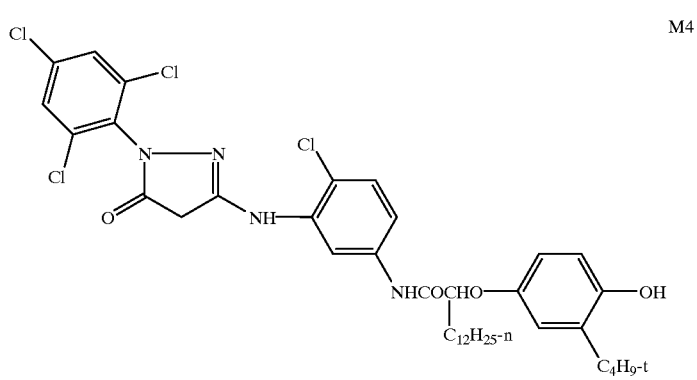
M4
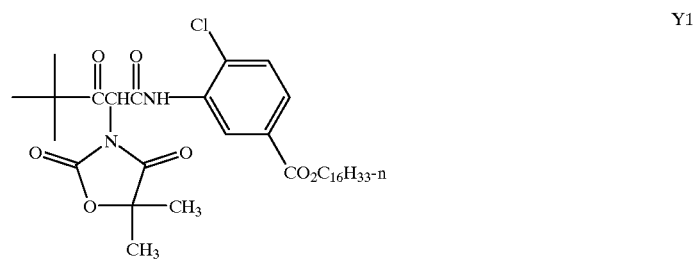
Y1
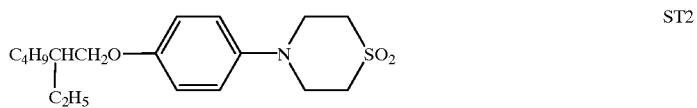
ST2
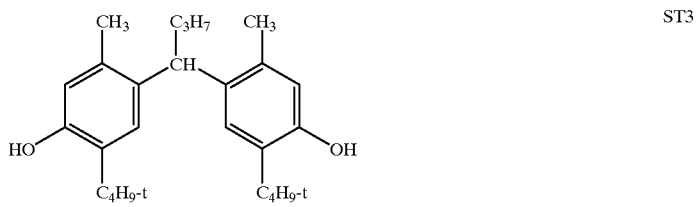
ST3
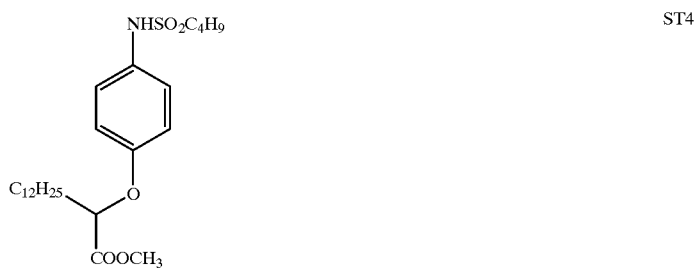
ST4
ST5

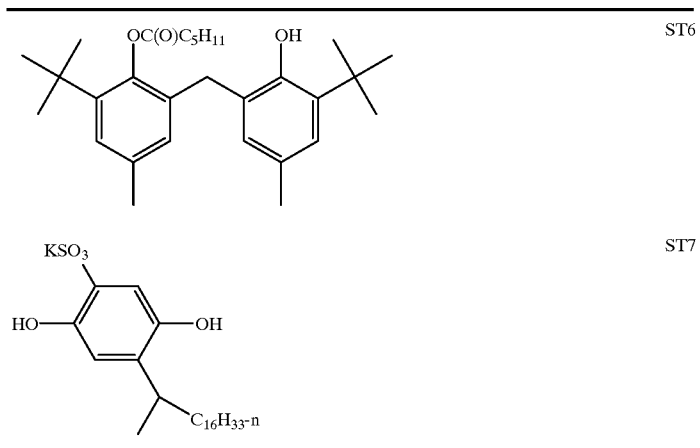

All papers were exposed with a step tablet wedge to three different colors (red, green and blue) on a Kodak Automatic 312 Color Printer and processed by HOPE 3026 processor using RA-4 chemicals to provide cyan, magenta and yellow colors.

All samples were prepared by coating aqueous colloidal dispersions on the exposed/processed paper described above at 3.0 cc/sq.ft. with dryer temperature @ 140° F. for 5 minutes to simulate tail-end of photofinishing process. Surfactant FT-248 (available from Bayer) was used at the dry laydowns of 2 mg per square foot respectively in all formulations to control the surface tension of coating fluid. Combination of Wax-1 and Wax-2 was used in formulations at 10 mg per square foot each to control the friction characteristic of the protective overcoat surface.

Scratch Resistance Ratings:
  0 . . . Totally abraded/worn
  1 . . . Dense scratches with associated haze band
  2 . . . Numerous scratches with associated haze band
  3 . . . Few scratches with associated haze band
  4 . . . Dense, heavy scratches
  5 . . . Numerous, heavy scratches
  6 . . . Few, heavy scratches
  7 . . . Dense, heavy scratches
  8 . . . Numerous, light scratches
  9 . . . Few, light scratches
  10 . . . No visible damage Test for Thermal Blocking 3.5×4 sq. in. samples were preconditioned in 50% RH/70C for 1 hour, then placed face-to-face (the overcoat layer of one sample being in contact with the same overcoat of the other sample) in for 6 hours with 1000 grams weight placed on top of the samples. The samples were pulled apart and evaluated according to the following scale:
  10 . . . no adhesion, no tack
  9 . . . very slight tack (aural observation)
  8 . . . slight tack (aural observation)
  7 . . . slight picking (visual observation)
  6 . . . Test moderate picking
  5 . . . significant picking
  4 . . . 0–25% coating removal
  3 . . . 25–50% coating removal
  2 . . . 50–75% coating removal Sample Testings Test for Water Resistance Ponceau Red dye is known to stain gelatin through ionic interaction. Ponceau red dye solution was prepared by dissolving 1 gram of dye in 1000 grams mixture of acetic acid and water (5 parts: 95 parts). Samples were soaked in the dye solution for 5 minutes followed by a 30-second water rinse to removed excess dye solution on the coating surface, then air dried. A sample with good a water resistant protective layer does not change the appearance by the test. Sample showed very dense red color if there was no protective overcoat applied to the surface or the formulation did not form a continuous overcoat layer under the drying condition specified above to provide water resistance property.

Test for Durability on Wet Wiping

An approximately 1 cm-diameter Ponceau Red dye solution was placed on the sample surface for 10 minutes. The liquid was then wiped up with Sturdi-Wipes paper towel with approx. 1000 grams weight applied on it. Several phenomena were often observed.

A: no mark of surface scratches were observed.
  B: very mild scratches on the protective overcoat layer were observed.
  C: very severe scratches on the protective overcoat layer were observed.
  D: protective overcoat layer been removed by wiping and Ponceau red dye penetrated into image layers to give a red mark.

A visual observation was recorded. "A" is most desirable and "B" is acceptable. A result of "C" or "D" is not acceptable at all.

Test for Dry Scratch Resistance

Each sample was rubbed with a dry paper towel for 40 passes under a pressure of 0.75 psi (500 grams over a 1.375 inch-diameter area). The scratches generated by the rubbing test were rated according to the description below. Ratings higher than 5 are desirable.

1 . . . 100% coating removal (i.e. complete failure).

A ranking of 10 is most desirable, a ranking of 7 to 9 is also acceptable.

Test for Fingerprint Resistance

Thermaderm, a specially formulated mixture (see preparation below) to mimic grease on human skin was applied to the surface of the protective overcoat by smearing with a finger at approx. 1 mg thermaderm over an area of 1 sq.cm. The sample was left for 24 hours in room condition (often 70° F./50% RH) and then wiped with cotton cloth to clean up the surface. The test area was ranked according to the following phenomenon.

A: no mark of fingerprints was observed.

B: very mild/faint fingerprints on the protective overcoat layer was observed.

C: very obvious fingerprint mark by Thermaderm on the protective overcoat layer was observed.

D: protective overcoat layer was removed on wiping.

A ranking of "A" is most desirable, "B" is acceptable, "C" and "D" are not acceptable at all.

Image Dye Stability Test

Samples were subjected to a fading test using the typical Xenon fadeometer with filtered glass as a light source. The samples were irradiated at a distance such that the irradiance on the sample was 50 Klux. Areas with density closest to 1.0 in three colors (yellow, magenta and cyan) were chosen for observation. The densities of such areas on the sample before and after light fade test were read by X-Write Densitometer using reflection mode, and the % loss was calculated and reported based on the equation below:

% loss = (1−(density after fade test/density before fade test))×100

Example 1

A series of samples were prepared with the protective overcoat formulation described in Table 1.

TABLE 1

| Sample ID | Note | Overcoat Composition (@mg/sq. ft.) | Water Resistance | Wet Wipe Durability | Dry Rub Durability | Fingerprint Resistance | Thermal Blocking |
|---|---|---|---|---|---|---|---|
| A-0 | Comparison | none | No | very poor | 5 | C | 10 |
| A-1 | Invention | P1 @ 200 | Yes | A | 6 | A | 7 |
| A-2 | Invention | P1 @ 200 P2 @ 50 | Yes | A | 5 | A | 10 |
| B-0 | Comparison | none | No | very poor | 8 | C | 10 |
| B-1 | Invention | P1 @ 200 | Yes | A | 6 | A | 7 |
| B-2 | Invention | P1 @ 200 P2 @ 50 | Yes | A | 6 | A | 9 |
| C-0 | Comparison | none | No | very poor | 5 | C | 10 |
| C-1 | Invention | P1 @ 200 | Yes | A | 6 | A | 6 |
| D-0 | Comparison | none | No | very poor | 5 | C | 10 |
| D-1 | Comparison | P1 @ 200 | Yes | A | 6 | A | 6 |
| D-2 | Comparison | P1 @ 200 P2 @ 50 | Yes | A | 5 | A | 9 |
| E-0 | Comparison | none | No | very poor | 5 | C | 10 |
| E-1 | Comparison | P1 @ 200 | Yes | A | 5 | A | 7 |
| E-2 | Comparison | P1 @ 200 P2 @ 50 | Yes | A | 8 | A | 10 |
| F-0 | Comparison | none | No | very poor | 5 | C | 10 |
| F-1 | Comparison | P1 @ 200 | Yes | A | 5 | A | 7 |
| F-2 | Comparison | P1 @ 200 P2 @ 50 | Yes | A | 4 | A | 10 |

As presented in Table 1, samples A-0, B-0, C-0, D-0, E-0, and F-0 were prints without latex protective overcoat of this invention, and therefore did not possess any resistance to stain or durability to scratches. Samples A-1, A-2, B-1, B-2, C-1, D-1, D-2, E-1, E-2, F-1 and F-2 were printed applied with latex protective overcoat, and thus exhibited superior resistance to stain, scratches and fingerprints.

Example 2

Samples used in example I were subjected to light fade test, and the results are shown in Table 2.

TABLE 2

| Sample ID | Note | Overcoat Composition (@mg/sq. ft.) | % density loss by light exposure for 2 weeks | | |
|---|---|---|---|---|---|
| | | | Cyan | Magenta | Yellow |
| A-0 | Comparison | none | 9.3% | 27.5% | 7.6% |
| A-1 | Invention | P1 @ 200 | 14.4% | 24.5% | 12.8% |
| A-2 | Invention | P1 @ 200 P2 @ 50 | 8.0% | 24.2% | 7.6% |
| B-0 | Comparison | none | 9.1% | 23.2% | 5.9% |
| B-1 | Invention | P1 @ 200 | 17.1% | 20.8% | 7.1% |
| B-2 | Invention | P1 @ 200 P2 @ 50 | 8.5% | 18.4% | 8.8% |
| C-0 | Comparison | none | 8.0% | 3.3% | 7.1% |
| C-1 | Invention | P1 @ 200 | 3.0% | 2.1% | 2.5% |
| D-0 | Comparison | none | 18.8% | 25.7% | 13.0% |
| D-1 | Comparison | P1 @ 200 | 11.9% | 36.0% | 12.3% |
| D-2 | Comparison | P1 @ 200 P2 @ 50 | 11.1% | 27.2% | 10.3% |
| E-0 | Comparison | none | 13.3% | 16.5% | 20.0% |
| E-1 | Comparison | P1 @ 200 | 10.4% | 25.9% | 17.0% |
| E-2 | Comparison | P1 @ 200 P2 @ 50 | 9.9% | 16.7% | 17.5% |
| F-0 | Comparison | none | 10.1% | 15.6% | 24.6% |
| F-1 | Comparison | P1 @ 200 | 11.3% | 17.4% | 25.2% |
| F-2 | Comparison | P1 @ 200 P2 @ 50 | 8.3% | 15.5% | 21.4% |

Papers A, B and C contained 1H-pyrazolo[1,5-b][1,2,4] triazole types of couplers, papers D and E contained 1H-pyrazolo[5,1-c]-1,2,4-triazole types coupler, and paper F contained a pyrazolone type of coupler in their respective magenta image-forming layers.

The magenta image stability of paper F was not influenced by the formula of latex overcoat, as shown by the data for samples F-0, F-1 and F-2.

The magenta image stability of papers D and E was greatly influenced but not improved by the latex overcoat formula, and is the subject of copending U.S. Ser. No. 09/354,055 filed jointly with the present application.

The magenta image stability of papers A, B, and C were surprisingly improved by the protective overcoat, as shown by the results of A-1 and A-2 compared to A-0, B-1 and B-2 compared to B-0 or C-1 compared to C-0.

The invention has been described in detail with particular reference to certain preferred embodiments thereof, but it will be understood that variations and modifications can be effected within the spirit and scope of the invention.

What is claimed is:

1. An imaged photographic element comprising an overcoat composition containing a water insoluble polymer having a Tg equal to or less than 30° C., said polymer comprising 75 to 100 weight percent of the monomer having the following formula:

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and wherein said overcoat composition being superposed on an imaged light sensitive silver halide emulsion layer on a support, said silver halide emulsion layer containing 1H-pyrazolo[1,5-b][1,2,4]triazole type of magenta coupler.

2. The photographic element of claim 1 further comprising at least one other water insoluble polymer, said one other water insoluble polymer having a Tg greater than 30° C.

3. The photographic element of claim 2 wherein said one other water insoluble polymer having a Tg greater than 30° C. is a microgel particle.

4. The photographic element according to claim 1 or 2, wherein said polymer having a Tg equal to or less than 30° C. comprises 80 to 95 weight percent of the monomer of formula (1).

5. The imaged photographic element of claim 1 wherein the support is transparent.

6. The imaged photographic element of claim 1 wherein the support is reflective.

7. The imaged photographic element of claim 1 wherein the overcoat composition further comprises biocides, surfactants and lubricants.

8. The imaged photographic element of claim 1 further comprising an antistatic layer superposed on the support.

9. The imaged photographic element of claim 1 further comprising a transparent magnetic layer superposed on the support.

10. An imaged photographic element having a protective overcoat thereon, the protective overcoat formed by the steps comprising;

providing an imaged photographic element having at least one silver halide light-sensitive emulsion layer, said silver halide emulsion layer containing a 1H-pyrazolo [1,5-b][1,2,4]triazole type of magenta coupler;

applying an aqueous coating overlying the at least one light sensitive silver halide emulsion layer, the coating comprising a water insoluble polymer having a Tg equal to or less than 30° C. and comprising 75 to 100 weight percent of the monomer having the following formula:

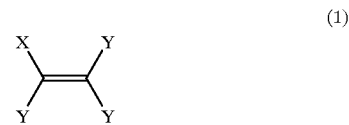

(1)

wherein: X is selected from the group consisting of Cl, F or CN, and Y is each independently selected from the group consisting of H, Cl, F, CN, $CF_3$, $CH_3$, $C_2H_5$, n-$C_3H_7$, iso-$C_3H_7$, n-$C_4H_9$, n-$C_5H_{11}$, n-$C_6H_{13}$, $OCH_3$, $OC_2H_5$, phenyl, $C_6F_5$, $C_6Cl_5$, $CH_2Cl$, $CH_2F$, $C_2F_5$, n-$C_3F_7$, iso-$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and drying the aqueous coating to provide an imaged photographic element having a protective overcoat.

11. The imaged photographic element of claim 10 wherein the aqueous coating further comprises at least one other water insoluble polymer, said one other water insoluble polymer having a Tg greater than 30° C.

12. The imaged photographic element of claim 10 or 11 wherein said polymer having a Tg equal to or less than 30° C. comprises 80 to 95 weight percent of the monomer of formula (1).

13. The imaged photographic element of claim 10 or 11 wherein the aqueous coating has a solids concentration of from 1 to 50 percent.

14. The imaged photographic of claim 10 or 11 wherein the support is transparent.

15. The imaged photographic element of claim 10 or 11 wherein the support is reflective.

16. The imaged photographic element of claim 10 wherein the protective overcoat further comprises biocides, surfactants and lubricants.

17. The imaged photographic element of claim 10 further comprising an antistatic layer superposed on the support.

18. The imaged photographic element of claim 10 further comprising a transparent magnetic layer superposed on the support.

* * * * *